(12) United States Patent
Luo et al.

(10) Patent No.: US 7,023,447 B2
(45) Date of Patent: Apr. 4, 2006

(54) BLOCK SAMPLING BASED METHOD AND APPARATUS FOR TEXTURE SYNTHESIS

(75) Inventors: Jiebo Luo, Rochester, NY (US); Yue Yu, La Jolla, CA (US); Chang Wen Chen, Princeton Junction, NJ (US)

(73) Assignee: Eastman Kodak Company, Rochester, NY (US)

( * ) Notice: Subject to any disclaimer, the term of this patent is extended or adjusted under 35 U.S.C. 154(b) by 604 days.

(21) Appl. No.: 09/847,636

(22) Filed: May 2, 2001

(65) Prior Publication Data

US 2002/0171660 A1 Nov. 21, 2002

(51) Int. Cl.
*G09G 5/00* (2006.01)

(52) U.S. Cl. .................................................. 345/582

(58) Field of Classification Search ........ 345/582–587;
382/254, 240, 260, 265
See application file for complete search history.

(56) References Cited

U.S. PATENT DOCUMENTS

| | | | | |
|---|---|---|---|---|
| 5,544,292 | A * | 8/1996 | Winser | 345/582 |
| 5,641,596 | A | 6/1997 | Gray et al. | 430/21 |
| 5,872,867 | A * | 2/1999 | Bergen | 382/254 |
| 6,643,406 | B1 * | 11/2003 | Hajjahmad et al. | 382/240 |
| 2002/0006229 | A1 * | 1/2002 | Chao et al. | 382/240 |
| 2003/0076334 | A1 * | 4/2003 | Dumitras et al. | 345/582 |

OTHER PUBLICATIONS

"Texture mixing and texture movie synthesis using statistical learning" Bar-Joseph, Z.; El-Yaniv, R.; Lischinski, D.; Werman, M.; Visualization and Computer Graphics, IEEE Transactions on , vol.: 7 , Issue: 2 , Apr.-Jun. 2001 pp.: 120-135.*

"An Implementation of Heeger and Bergen's Texture Analysis/Synthesis Algorithm" Thomas F. El-Maraghi Department of Computer Science;University of Toronto; Sep. 2, 1997.*

(Continued)

*Primary Examiner*—Ryan Yang
(74) *Attorney, Agent, or Firm*—David M. Woods

(57) ABSTRACT

A novel multi-resolution block sampling based texture analysis/synthesis algorithm. A reference texture is assumed to be sample from a probability function. The synthesis of a similar, but distinctive, synthetic texture is handled in a process and by an apparatus that first estimates and then resamples the probability function. In order to achieve good and fast estimation of the probability function for a reference texture and in order to retain the texel structural information during the synthesis, a novel concept of block sampling and a corresponding novel texture synthesis scheme based on multi-resolution block sampling is employed. As a result of this novel approach, the computational complexity of the present invention is much lower than that of other approaches to the problem. In addition, for textures that exhibit a high degree of directionality, a process, which integrates estimation of dominant texture direction and the synthesis algorithm is employed to handle directional textures. The dominant direction is used to orient and then control the synthesis process so as to preserve the dominant reference image direction.

35 Claims, 9 Drawing Sheets

OTHER PUBLICATIONS

"Texture Mixing and Texture Movie Synthesis using Statistical Learning" Bar-Joseph, Z.; El-Yaniv, R.; Lischinski, D.; Werman, M.; Visualization and Computer Graphics, IEEE Transactions on , vol.: 7 , Issue: 2 , Apr.-Jun. 2001.*

B. Julesz, "Visual pattern discrimination", IRE Trans. of Information Theory IT-8. System, Man, and Cybernetics, p. 84-92, 1962.

R.M. Haralick, K. Shanmugan, and I. Dinstein. "Textural Features for Image Classification", IEEE Trans. System, Man, and Cybernetics, vol. 8, pp. 610-621, Nov. 1973.

G.R. Cross and A.K. Jain, "Markov random field texture models", IEEE Trans. On Pattern Analysis and Machine Intell., vol. 5, No. 1, pp. 25-39, Jan. 1983.

H. Derin and H. Elliott, "Modeling and Segmentation of Noisy and Textured Images Using Gibbs Random Fields". IEEE Trans. Pattern Analysis and Machine Intell., vol. 9, No. 1, pp. 39-55, Jan. 1987.

M. Bastiaans, "Gabor's expansion of a signal into Gaussian elementray signal", IEEE, vol. 68, p. 538-539, 1980.

S.G. Mallat, "A Theory for Multiresolution Signal Decomposition: The Wavelet Representation", IEEE Trans. Pattern Anal. and Machine Intell., vol. 11, pp. 674-693, Jul. 1989.

D. J. Heeger, J.R. Bergen, "Pyramid-based texture analysis/synthesis", ACM Proceedings of SIGGRAPH, pp. 229-238, Aug. 1995.

S.C. Zhu, Y.N. Wu and D. Mumford, "Filters, random fields and maximum entropy (FRAME): Towards a Unified Theory for Texture Modeling", International Journal of Computer Vision, vol. 27, No. 2, pp. 107-126, Jun. 1996.

J.S. De Bonet, "Multi-resolution sampling procedure for analysis and synthesis of texture image", ACM Proceedings of SIGGRAPH, pp. 361-368, Aug. 1997.

E.P. Simoncelli, J. Portilla. "Texture,Characterization via Joint Statistics of Wavelet Coefficient Magnitudes", IEEE Inter. Conf. on Image Processing), vol. 1, pp. 62-66, Oct. 1998.

A. Efros and T. Leung, "Testure synthesis by non-parametric sampling", IEEE Int. Conf. on Computer Vission, vol. 2, pp. 1033-1038, Sep. 1999.

Ying-Qing Xu, Baining Guo, and Harry Shum. "Chaos Mosaic: Fast and Memory Efficient Texture Synthesis" Microsoft Research Report, Apr. 2000.

L.Y. Wei and M. Levoy, "Fast texture synthesis using tree-structured vector quantization", ACM Proceedings of SIGGRAPH, 2000.

* cited by examiner

BLOCK SAMPLING BASED METHOD AND APPARATUS FOR TEXTURE SYNTHESIS

BACKGROUND OF THE INVENTION

1. Field of the Invention

The present invention relates to digital imaging. More specifically, the present invention relates to synthesis of image textures.

2. Description of the Related Art

Texture is a fundamental phenomenon in natural scenes and exists in many areas of imaging technology. An image of grass, or a piece of tree bark, or even an array of letters can be considered as a texture. While textures often exist naturally in imaging technology, there are a host of applications where synthetically produced textures are useful. Examples include computer image generation and animation, special effects, image repair, image scaling, image compression, and a variety of other graphical and imaging applications.

Texture modeling and synthesis are complex problems. In fact, there is no single model that is capable of precisely describing all textures. Texture is a subtle concept with several defining characteristics, the three principle being randomness, periodicity, and directionality. Since texture is an important cue in human visual perception, texture processing has become an actively studied area in image processing, computer graphics, and computer vision.

A first feature, periodicity is an important feature for many textures. Textures with periodicity consist of many small elementary units, also referred to by those skilled in the art as "texels". At some reasonable scale, most texels in a texture appear to be very similar to one another, having the similar shape, size, and orientation. However, upon closer scrutiny, texels are not typically identical to one another, and therefore, most textures are not simply repetitions of texels. Periodicity of texture seems to suggest that similar textures should have the same texel placement rules in the reproduction of texture patterns using texels.

A second feature of texture is randomness. With respect to the generation of a texture, the differences between individual texels and their placement within the texture is a stochastic process. That is, the differences may be in size, orientation, or a combination of all parameters. Therefore in terms of periodicity and randomness of a texture, texture can be considered as a sampling of a stochastic processing with the same period.

A third feature, directionality, is not present in all textures. However, when directionality is present, then there exist one or more directions with respect to which texels are aligned. As a practical matter, when the number of salient texture directions becomes larger than just a few, a texture can be treated as an inhomogeneous, non-directional texture for the purpose of texture synthesis.

Generally, the goal of texture synthesis is to generate a new synthetic texture according to a reference texture so that the new synthetic texture is both similar in appearance to the reference texture in terms of human perception, and, is sufficiently different from the reference texture so as not to appear to be a mere copy thereof. Thus, it is preferable that the reference texture contain a relatively large number of texel elements so that all the necessary features of the reference texture can be preserved. Based on the foregoing, it is understood that there exist two basic principles in texture synthesis. First, a need to retain perceived textural characteristics from the reference texture within the synthetic texture. And second, a sufficient perceived visual difference between the synthetic texture and reference texture.

It is apparent that the synthesis of textures is a challenging problem in imaging science. Given the aforementioned stochastic nature of texture, a texture can be considered as a sample of a probability function. Thus, texture analysis/synthesis can be considered as a procedure that estimates and resamples this probability function. In the 1960's, Julesz (see B. Julesz, "Visual pattern discrimination", *IRE Trans. of Information Theory IT*-8, *System, Man, and Cybernetics*, pp. 84–92, 1962.) proposed a general texture model which states that $k^{th}$ order statistical information can describe texture perception effectively. In fact, methods have been developed based on the second-order statistical information of textures, including correlation and SGLDM (see R. M. Haralick, K. Shanmugan, and I. Dinstein, "Textures features for image classification", *IEEE Trans. System, Man, and Cybernetics*, vol. 8, pp. 610–621, November 1973). Because there exists strong correlation between neighboring pixels of a texture, such statistical models as Gaussian Markov random field (GMRF) (see G. R. Cross and A. K. Jain, "Markov random field texture models", *IEEE Trans. On Pattern Analysis and Machine Intell.*, Vol. 5, No. 1, pp. 25–39, January 1983)and Gibbs distribution (see H. Derin and H. Elliott, "Modeling and segmentation of noisy and textured images using Gibbs random fields" *IEEE Trans. Pattern Analysis and Machine Intell.*, Vol. 9, No. 1, pp. 39–55, January 1987) have also been adopted to characterize textures. More recently, multi-resolution time-frequency analysis tools such as Gabor transform (see M. Bastiaans, "Gabor's expansion of a signal into Gaussian elementary signal", *IEEE*, vol.68, pp. 538–539, 1980), wavelet transform (see S. G. Mallat, "A theory for multi-resolution signal decomposition: the wavelet representation", *IEEE Trans. Pattern Anal. and Machine Intell.*, vol. 11, pp. 674–693, July 1989, and I. Daubechies, "Orthonormal bases of compactly supported wavelets", *Communications on Pure and Applied Mathematics*, vol.41, pp. 909–996, November 1988), Wigner distribution, and Laplacian pyramid transform have been developed since neurophysiology research suggests that human visual system decomposes retinal images into different frequency bands (see D. J. Heeger, J. R. Bergen, "Pyramid-based texture analysis/synthesis", *ACM Proceedings of SIGGRAPH*, pp. 229–238, August 1995).

Through the combination of statistical modeling and multi-resolution decomposition, texture analysis/synthesis models with multi-resolution statistical structures have been contemplated by Heeger. A histogram is an example of first-order statistical information, which can be applied in performing statistical matching in a multi-resolution fashion. However, because histograms do not account for positional or structural information of the texture, they only work well for highly random textures. They are even more limited when used for color textures. This is because a pixel in a color texture is determined by three components, so three individual red-green-blue ("RGB") textures must be synthesized. Because position, or spatial, information is lost, the final combined color textures are typically poor, even if the three individual synthetic RGB images are satisfactory in and of themselves.

Zhu et al. (see S. C. Zhu, Y. N. Wu and D. Mumford, "FRAME: Filters, random fields and maximum entropy towards a unified theory for texture modeling", *International Journal of Computer Vision*, vol. 27, No.2, pp.107–126, June 1996) introduced a FRAME model for textures. This model consists of two major steps. The first step involves choosing appropriate filters to capture the characteristics of the texture and extracting the histograms of filtered images. This step is very similar to Heeger's method, although Zhu et al. use different filter banks for different textures instead of a fixed steerable wavelet transform, as suggested by Heeger. The second step in the Zhu et al. method is to derive an estimate of the probability function of a reference texture using the maximum entropy principle and then use the Gibbs sampler to synthesize textures by drawing typical samples from the estimated probability function. The essence of the Zhu et al. method is that it is constrained such that a good synthetic texture corresponds to the maximum entropy of a reference probability function. However, no evidence has demonstrated that this principle is appropriate for human perception of textures although the maximum entropy principle has been widely used in statistics.

De Bonet (see J. S. De Bonet, "Multi-resolution sampling procedure for analysis and synthesis of texture image", *ACM Proceedings of SIGGRAPH*, pp. 361–368, August 1997) proposed a statistical multi-resolution technique. In his method, a fundamental hypothesis is that images perceived as textures contain regions, which differ by less than a certain discrimination threshold. And therefore, random displacement of these regions does not change the perceived characteristics of the texture. Based on this hypothesis, a set of sampling constraints is imposed in sampling the coefficients of all bands in a multi-resolution technique. While De Bonet's hypothesis has utility, it is generally not adequate to achieve a good synthetic texture because random placement within homogeneous regions changes only certain microstructures of texels and leaves the macro-structure of texels intact. De Bonet's algorithm usually produces a synthetic texture that appears as a copy of the reference texture at a low randomness threshold, and a scrambled or fuzzy version of a tessellation of the reference texture image at a high randomness threshold.

Portilla and Simoncelli {see E. P. Simoncelli, J. Portilla, "Texture characterization via joint statistics of wavelet coefficient magnitudes", *IEEE Inter. Conf. On Image Processing*}, vol. 1, pp. 62–66, October 1998) proposed a scheme for texture representation and synthesis using correlation of complex wavelet coefficient magnitudes. This scheme falls in the same category as those of Heeger and De Bonet. Unlike previous techniques, a performance improvement resulted from the inclusion of a cross-correlation between the coefficient magnitudes, which was shown to improve texture synthesis in a number of aspects including directionality and periodicity of textures. While this method can capture both stochastic and repeated textures well, it fails when generating highly structural textures.

A non-parametric method based on the Markov random field ("MRF") model was developed by Efros (see A. Efros and T. Leung, "Texture synthesis by non-parametric sampling", *IEEE Int. Conf. on Computer Vision*, vol. 2, pp. 1033–1038, September 1999). The advancement taught by the Efros method is that it employs the deterministic search in the reference texture to estimate the conditional probability distribution function through histograms, and then synthesizes each pixel by sampling the histograms. This method can preserve the local structures to a significant degree. However, a review of the images produced by this approach makes apparent that the algorithm actually copies the pixels of the reference texture image into the synthetic image using probability sampling. Therefore, if it is desired to synthesize a new texture of the same size as the reference image, the Efros method may actually produce, more or less, a copy of the reference texture. Furthermore, the Efros algorithm is very processor intensive and time-consuming because it will synthesize a texture, pixel by pixel, through an exhaustive search.

In a work related to Efros, Wei (see L. Y. Wei and M. Levoy, "Fast texture synthesis using tree-structured vector quantization", ACM Proceedings of SIGGRAPH, 2000) also developed a texture synthesis based on MRF. The difference between Wei's method and Efros's method is that Wei employs deterministic search matching to directly synthesize each pixel instead of estimating a histogram, as in Efros's algorithm. Thus, Wei's algorithm should achieve faster synthesis. Moreover, Wei proposed to use tree-structured vector quantization to further speed up the synthesis. However, a notable shortcoming for such types of MRF based methods, including both Wei's and Efros's methods, is that they typically do not reproduce clear structures in the synthetic image.

Xu et al. (see Y. Q. Xu, B. N. Guo and H. Shum, "Chaos mosaic: fast texture synthesis", *Microsoft Research Report*, April 2000) proposed a method of texture synthesis that employs a random block sampling approach. Xu teaches the use of a cat map (see V. 1. Arnold and A. Avez, *Ergodic problems of Classical Mechanics*, Benjamin, 1968) iteration as a chaos transformation to produce a texture. However, the iterative block moving in Xu's method breaks the local features. Also, since Xu et al. do not employ a multi-resolutional statistical process, the corresponding benefits are not realized. It is also apparent that the cat map approach fails particularly with respect to directional textures.

Thus there is a need in the art for a method and apparatus to synthetically produce textures from reference textures that meet the subtle requirements of similarity and distinctiveness, while also preserving directionality, repetitiveness, and randomness perceived in the reference texture.

SUMMARY OF THE INVENTION

The need in the art is addressed by the system and method for synthesizing a texture from an array of pixels of the present invention. The inventive method includes the steps of decomposing the array of pixels through application of a plurality of wavelet transforms to produce a plurality of coefficients ordered to correspond to the array of pixels and defining a plurality of source sections within the plurality of coefficients. Then, moving the coefficients from the plurality of source sections to a reordered plurality of destination sections and, synthesizing a texture by performing the plurality of inverse wavelet transforms on the reordered the plurality of coefficients.

In a refinement of the foregoing method, the array of pixels is a reference texture image. In another refinement, the reordered plurality of destination sections are reordered by random selection. In another refinement, the method includes the further step of storing the plurality of coefficients in a memory array, and the moving step is accomplished by moving coefficient values within the memory array on a section by section basis. In another refinement, the array of pixels is a texture image, and the size of the section is selected to be at least as large as a texel element within the texture image. In another refinement, the sections are block shaped. In another refinement, the plurality of wavelet transforms are steerable wavelet transforms that produce the plurality of coefficients as a multiresolution representation of the pixels of the reference texture. In another refinement, the plurality of coefficients includes at least a lowpass band representation of the pixels. In another refinement, the wavelet transforms accomplish a mapping of the pixels from a spatial domain to coefficients in the wavelet domain, and the inverse wavelet transform accomplishes a mapping of the plurality of coefficients from the wavelet domain to pixels in the spatial domain. In another refinement, the plurality of destination sections are sampled and the inverse wavelet transforms are applied recursively at all resolution levels of the multi-resolutional representation.

The method is further refined with respect to color images where the array of pixels includes a red pixel array, a green pixel array, and a blue pixel array, forming a color image, and further comprising the steps of repeating the decomposing and the synthesizing steps three times, for each of the red pixel array, the green pixel array, and the blue pixel array, while utilizing the same defining and moving steps for each. In another refinement related to texture size, the texture is scaled to a different size according to a scaling factor, by including the steps of randomly sampling the plurality of source sections, and moving the coefficients to a number of the plurality of destination sections equal to the number of the plurality of source sections times the scaling factor. In another refinement, the plurality of destination sections are scaled to a different size according to a scaling factor, and the method includes the further step of interpolating the coefficient's sizes by the factor.

The present invention also teaches that synthesized textures can account for highly directional textures. A particular method of synthesizing a directional texture from an image texture having an array of pixels is taught. It includes the steps of determining the direction of the image texture and calculating an offset angle between the determined direction and a reference direction. Then, rotating the array of pixels according to the offset angle, and decomposing the rotated array of pixels through application of a plurality of wavelet transforms to produce a plurality of coefficients ordered to correspond to the rotated array of pixels. Next, defining a plurality of source sections of the plurality of coefficients, and moving the coefficients from the plurality of source sections to a plurality of destination sections which are reordered, but constrained to a position along a line parallel to the reference direction. Finally, synthesizing a texture by performing the plurality of inverse wavelet transforms on the reordered the plurality of coefficients, and rotating the synthesized texture by the negative of the offset angle. In a refinement to this method, a further step is added where the determining step further includes the steps of extracting edge information from the image, and determining the direction of the image texture from the edge information. In another refinement, the edge information is extracted using a Canny operator. In another refinement, the direction is determined using a Hough transform.

The present invention also teaches a processor based system for synthesizing a texture from an array of pixels. The system includes a memory having stored therein the array of pixels. The system further includes a processor coupled to the memory. The processor recalls and decomposes the array of pixels, through application of a plurality of wavelet transforms, to produce a plurality of coefficients ordered to correspond to the array of pixels. The system stores the plurality of coefficients in the memory. Also, the processor defines a plurality of source sections of the plurality of coefficients in the memory and moves the coefficients from the plurality of source sections in the memory to a reordered plurality of destination sections in the memory. The processor synthesizes a texture by performing a plurality of inverse wavelet transforms on the reordered the plurality of coefficients and store the resultant pixels in the memory.

Typically, the array of pixels is a reference texture image. In a refinement, the processor is operable to reorder the plurality of destination sections by random selection. In another refinement, the array of pixels is a texture image, and the processor is operable to set the size of set source sections to be at least as large as a texel element within the texture image. In another refinement, the sections are block shaped. In yet another refinement, the plurality of wavelet transforms are steerable wavelet transforms that produce the plurality of coefficients as a multi-resolutional representation of the pixels. In the illustrative embodiment, the plurality of coefficients includes at least a lowpass band representation of the pixels. In another refinement, the processor is operable to calculate wavelet transforms that map the pixels from a spatial domain to coefficients in the wavelet domain, and operable to calculate the inverse wavelet transforms so as to map the plurality of coefficients from the wavelet domain to pixels in the spatial domain. In the illustrative embodiment, the processor samples the plurality of destination sections, the processor is operable to perform the inverse wavelet transforms recursively at all resolution levels of a multi-resolutional representation. In another refinement, the processor is operable to scale the texture to a different size according to a scaling factor, by randomly sampling the plurality of source sections in the memory, and moving the coefficients to a number of the plurality of destination sections in the memory equal to the number of the plurality of source sections times the scaling factor. In another embodiment, the plurality of destination sections in the memory are scaled to a different size according to a scaling factor, and the processor is operable to interpolate the coefficient sizes by the scaling factor.

An additional apparatus for synthesizing a directional texture from an image texture having an array of pixels is also taught in the present invention. This apparatus includes a memory having the array of pixels stored therein, and, a processor coupled to the memory and operable to recall a portion of the array of pixels and determine a direction of the image texture, and operable to calculate an offset angle between the determined direction and a reference direction. Also, the processor is operable to rotate the array of pixels in the memory according to the offset angle and to decompose the rotated array of pixels through application of a plurality of wavelet transforms to produce and store in the memory a plurality of coefficients ordered to correspond to the rotated array of pixels. Also, the processor is operable to define a plurality of source sections of the plurality of coefficients and operable to move the coefficients from the plurality of source sections to a plurality of destination sections in the memory which are reordered, but constrained to a position along a line parallel to the reference direction. And, the processor is operable to synthesize a texture by performing a plurality of inverse wavelet transforms on the reordered the plurality of coefficients in the memory, and operable to rotate the synthesized texture in the memory by the negative of the offset angle.

The foregoing apparatus is improved whereby the processor determines the direction of rotation of the image texture by extracting edge information from the image, and determining the direction of the image texture from the edge information. In another improvement, the processor is operable to extract the edge information using a Canny operator. In another improvement, the processor is operable to determine the direction using a Hough transform.

DESCRIPTION OF THE INVENTION

Figure 1:
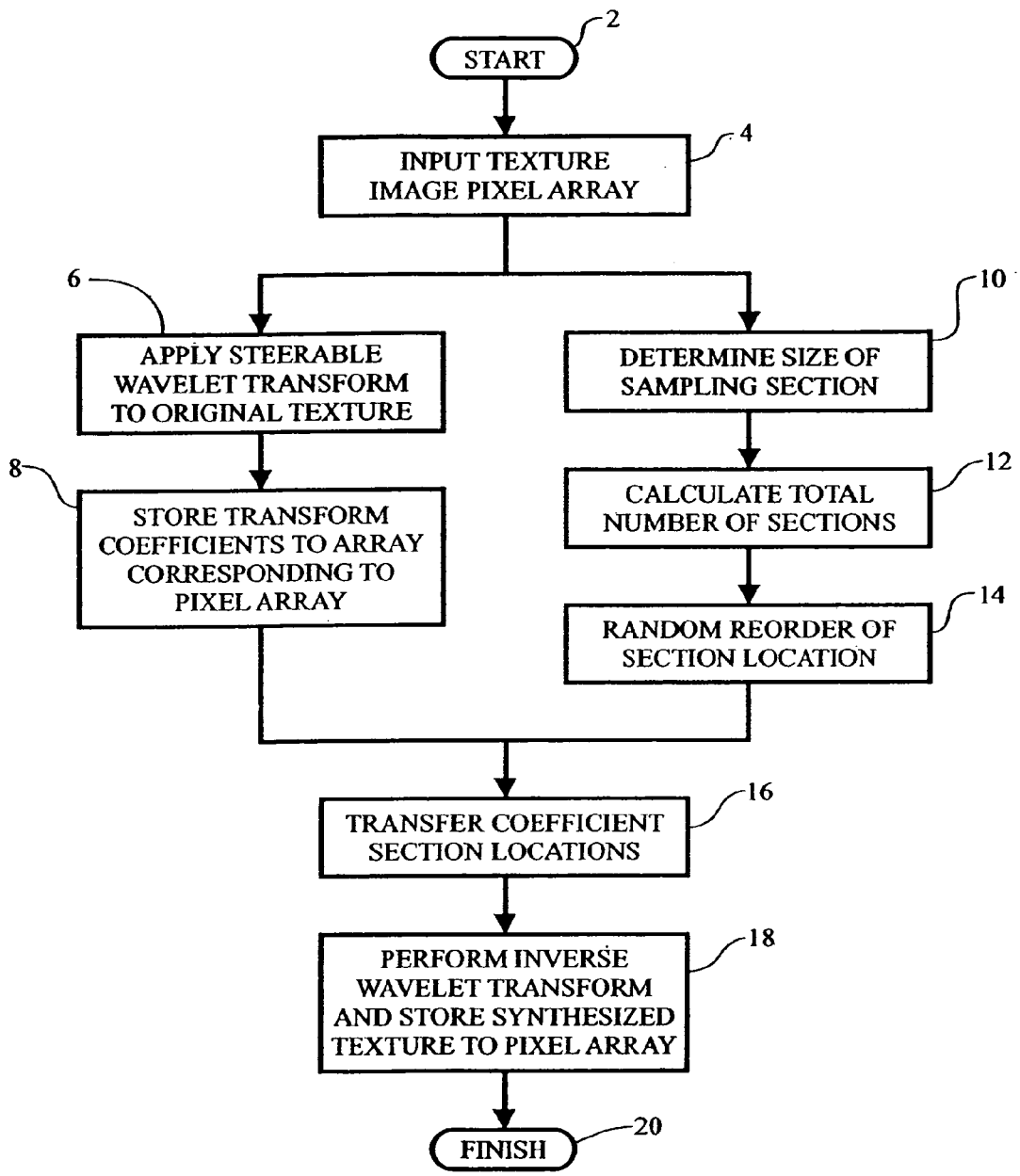
FIG. 1 is a flow diagram of an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The need in the art for texture synthesis is addressed by the present invention through utilization of a novel approach of block sampling and a corresponding novel texture analysis/synthesis algorithm. This approach is motivated by two considerations. First, an actual texture is considered as a sample of a certain probability function; thus texture analysis/synthesis can be considered as a procedure that estimates and resamples this probability function. Second, block sampling is an effective way to estimate the probability function while maintaining the reference texture texels, without incurring great computation expense. At the same time, not breaking the structural information of textures to too great an extent.

Since a texture can be modeled as a sample of a random process, a statistical model can be readily utilized to describe the texture pattern. However, as a typical non-stationary random process, it is difficult to describe a texture using a small number of parameters. A reasonable approach is to consider textures as samples of a probability distribution, that is, one realization of this probability distribution. A synthetic texture can be considered as another realization of the same probability distribution. Based on this concept, texture analysis/synthesis can be accomplished by estimating this probability distribution of a reference texture and then generating a new synthetic texture from that estimated probability distribution.

Taken in a mathematical approach, suppose the $N^{th}$ order moment of a reference texture is given by:

$$E[x^n] = \int_{-\infty}^{\infty} x^n f(x) dx = \zeta_n, n = 1, 2, \ldots, N \qquad (1)$$

where x is a random variable and f(x) is its corresponding probability distribution.

The problem of texture analysis/synthesis becomes finding a set $\Omega_1$ of all probability distributions f(x) that satisfy the following:

$$\Omega_1 = \{f(x) | E[x^n] = \zeta_n, n = 1, 2, \ldots, N\} \qquad (2)$$

Those of ordinary skill in the art will appreciate that the estimation of Equation (2) is extremely involved and generally impractical given real-world environment limitations. From the computational complexity point of view, some low order statistics, such as first and second order, are usually used to approximate the real probability function.

Psychovisual research suggests that human perception of texture is performed in a multi-resolution fashion. This motivates the present invention to extend the application of Equations (1) and (2) to multi-resolution. Steerable wavelet transform (see E. P. Simoncelli, W. T. Freeman, E. H. Adelson, and D. J. Heeger, "Shiftable multiscale transform," IEEE Trans. On Information Theory, Vol. 38, No.2, March 1992, pp. 587–607, and W. T. Freeman and E. H. Adelson, "The design and use of Steerable filters", *IEEE Trans. on Pattern Analysis and Machine Intell.*, Vol. 13, No. 9, September 1991, pp. 891–906) is known to those of ordinary skill in the art to be able to maintain invariance property, they are applied to decompose the reference texture to a multi-resolution representation in the present invention. More specifically, because the steerable wavelet transform is a linear transform and can be considered as a mapping from spatial domain to wavelet domain, the model of Equation (2) for a multi-resolution representation as follows:

$$\Omega 2 = \{f_{WT}(x) | E[WT\{x\}^n] = \xi_n, n=1,2,\ldots,N\} \quad (3)$$

where $$E[WT\{x\}^n] = \int_{-\infty}^{\infty} WT\{x\}^n f_{WT}(x)\,dx = \xi_n, n=1, 2, \ldots, N \quad (4)$$

Both models of Equations (2) and (3) are purely statistical and have been adopted by a number of others to build their texture models (see Heeger, Zhu, and De Bonet, supra).

While the above models articulate an elegant approach, it is difficult to use them directly for texture modeling. The difficulties arise from two aspects. On one hand, it is difficult to estimate how many orders of statistical information are needed to guide a satisfactory regeneration of textures. On the other hand, even though an appropriate statistical model can be established, it remains an issue to generate a new texture from such a model with reasonably constrained degree of computational complexity.

In addition to the foregoing, there is another major drawback in the application of statistics-based models using only limited lower-order statistics. The positional information of a reference texture image is usually not well preserved, making it difficult for such statistical models to work well for highly structured textures. The failure of Heeger's method on highly structured textures confirms a point: having the statistics matched with the reference texture does not guarantee that the synthetic texture is perceptually similar to the reference texture. Matching lower-order statistics is simply a necessary condition for a convincing synthetic texture, it is not a sufficient condition. The present invention teaches a novel block sampling method, which not only effectively achieves estimation and sampling of a statistical model, but also retains the structural information to a large degree, while managing the computational load to practical real-world levels.

In addition to randomness and directionality, periodicity, or repetitiveness, is the most important feature of textures. In other words, texture consists of many small elementary units, commonly referred to as texels. In fact, the initial human perception of textures is texel. Typically, there exists one type of texel for homogeneous textures and two or more types of texels for inhomogeneous textures. For example, referring to FIG. 8, there is one type of texel for this texture, which is a single bean. This texture consists of beans, including the bean's perspective projections as well as partially occluded versions. With respect to the approach to the generation of synthetic textures according to the present invention, a texel is the most fundamental unit in human perception of textures.

According to the present invention, a principle is implemented requiring that any method for estimating the probability function should not break the texel. And, as a base concept, it is preferable to retain the majority of the texels that appear in different parts of a reference texture, or be able to re-generate like texels if destruction of reference texels cannot be avoided during estimation of the synthetic texture.

On the other hand, extracting texels in a reference texture is extremely difficult, and may not be necessary if a suitable alternative approach is devised. Moreover, even if texels are extracted from a reference texture, it is still a major issue to generate statistically varied texels because a natural texture is not a simple tessellation of the same texels. And, the task of devising rules to accomplish a natural looking tessellation is also statistical in nature and thus increases the computational magnitude of such an approach to synthetic texture generation.

Thus, considering the foregoing, two basic requirements are established when estimating the probability distribution of a texture. First, estimation of the probability distribution of a reference texture needs to be optimal. That is, the estimated statistical properties should be as close to those of the reference texture as possible. And, second, the synthetic texture should consist of texels which resemble as close as possible those in the reference texture. In fact, the prior art is not able to satisfy the second requirement, and whether or not this requirement is satisfied becomes a key to distinguish a good texture analysis/synthesis algorithm from an inferior one.

Regarding the first requirement, those of ordinary skill in the art will appreciate that it is non-trivial to develop a good method to estimate the statistics of textures, even for low-order statistical information. Intuitively, if the reference and synthetic texture images are to have identical low-order statistical properties, perhaps the simplest method is to exchange the positions of pixels and not to change their pixel values during this exchanging process. This way, the new image will have exactly the same pixels as the reference texture. This is referred to as pixel sampling. The essence of a good texture synthesis method is to draw samples from the same statistical source that produces the reference texture. The simplest way is to draw the same pixels and move them to the new positions. However, pixel sampling cannot guarantee to produce a good synthetic texture because the texel information may be destroyed completely although the first-order statistics are identical.

It is also intuitive that straightforward block sampling satisfies the first principle for synthesizing a good texture because the synthesized texture also has completely the same pixels as the reference texture. Moreover, block sampling does not completely break the texels, provided the block size is greater than that texel size. However, the blocks may cut texels and include fractions of texels in addition to whole texels. Although it is generally true that no new variants of the texels are generated in the synthetic texture where block sampling is employed, existing texels are moved to different positions with the blocks. This facilitates the perception of a different version of the same texture by human observers without modifying the texels themselves. In fact, block sampling can be considered as a specific implementation of the MRF model simply because all pixels of the synthetic texture come from the reference texture and neighbor pixels in the synthetic texture satisfy the same constrained relationship as in the reference texture at the block level. Such method enables the synthetic texture to retain the structural information of the reference texture image to a large extent.

Figure 8:
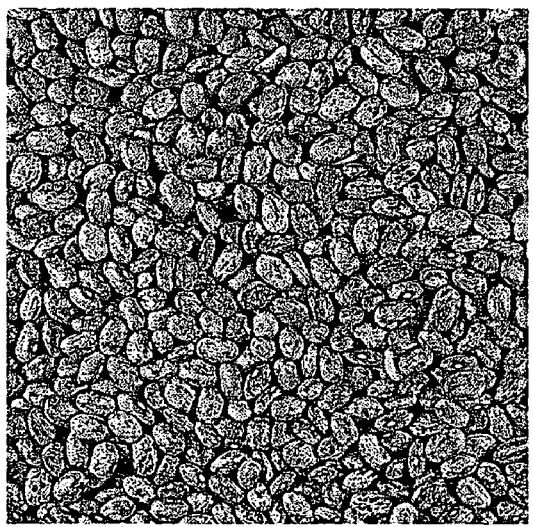
FIG. 8 is a reference image texture utilized by an illustrative embodiment of the present invention.
Figure 9:
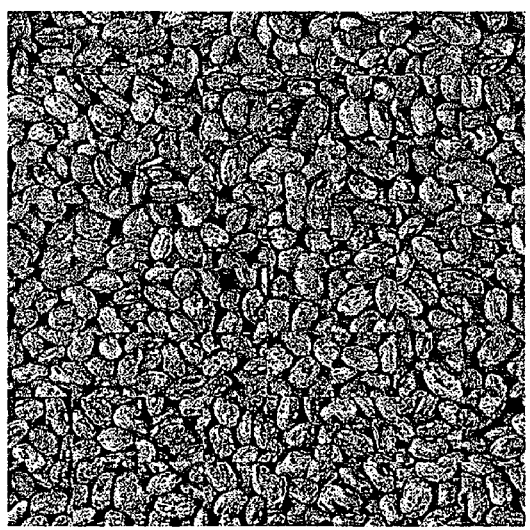
FIG. 9 is a synthetic texture produced by partial application of an illustrative embodiment of the present invention.

However, one problem with straightforward block-based sampling is blocking effect, which gives rise to the perception of artificial boundaries. FIG. 8 shows a reference texture and FIG. 9 shows a simple block based sampling synthetic texture. In this example, the size of block is 64 by 64 pixels taken from a reference texture size of 512 by 512 pixels. The blocking effect in FIG. 9 is obvious. Thus, it is apparent that such a synthetic texture approach does not produce acceptable results.

If the reference texture is decomposed with a steerable wavelet transform, a multi-resolution representation of the reference texture image can be obtained. And, the lowpass band at the lowest resolution can be visualized as a blurred version of reference texture. In other words, the lowpass band is a coarse resolution representation of the reference texture. If the block sampling is performed in this lowpass band, then the blocking effect is perceptually reduced because of the blurred representation that the lowpass band represents. The block used in this approach should be smaller in size than what we use in the original image resolution. For example, a size of $(M/2^L)$ by $(M/2^L)$, where L is the decomposition level. The blocking effect is greatly reduced because the lowpass band contains greatly reduced details. Moreover, within the multi-resolution representation, the coefficients that are in different bands at different resolution levels but correspond to the same spatial positions are highly correlated. Therefore, block sampling is applied recursively to all bands of all resolution levels. Note that the size of a block at different resolution levels will differ according to the order of the resolution level. Reference is directed to FIG. 1, which is a flow diagram of the synthetic texture generation process according to an illustrative embodiment of the present invention. The process begins at step 2 and proceeds to step 4, where a reference texture pixel array is input. A determination of the sampling block size is made at step 10. More generally, the sampling block is referred to as a section, which may have any of a variety of shapes. A block, or square, shape is useful because it generally requires a lower computational burden over more complex section shapes. However, other section shapes, such as hexagons, may be useful for producing better results, at an acceptable computational load level. At any rate, the section size should be such that it is larger than the texel size on the reference texture. Continuing in FIG. 1, at step 12, the total number of blocks is calculated. In an example used for illustration, the reference image is of a size 512 by 512 pixels, and the block size is 32 by 32 pixels, so that total number blocks equals 256. For simplicity, the present illustration assumes that the reference texture can be divided into an integer number of blocks. However, a synthetic image of arbitrary size can be readily generated using either or both of pre-cropping and post-cropping techniques. Of course, the choice of block size in multi-resolution block sampling is an important issue. An intuitive rule-of-thumb applied in an illustrative embodiment of the present invention is that a block should contain one or more texels. Although the size of texels is generally unknown, presumably the reference texture contains sufficient information of texels and the corresponding placement rule. Thus, it usually works well if the size of the block is chosen to be 1/16 to 1/8 of the size of the reference texture.

Continuing in FIG. 1, at step 14, the sections are randomly reordered. In an illustrative embodiment, this proceeds by reordering all the random numbers in the set of R in a descending order or ascending order. Then denote the new random number set as RO, which has completely the same random numbers as set R but the positions of the random numbers are different. Then, for each value in set R, find its position in set RO and generate a new set RS using such position numbers. For example, if set R is 3.2, 2.1, 5.1, 1.3, 9.0 then set RO will be 1.3, 2.1, 3.2, 5.1, 9.0 when set R is reordered according to an ascending order, then set RS is 3, 2, 4, 1, 5. Those of ordinary skill in the art will appreciate that there are many ways to randomly reorder such a set of section locations.

Figure 2:
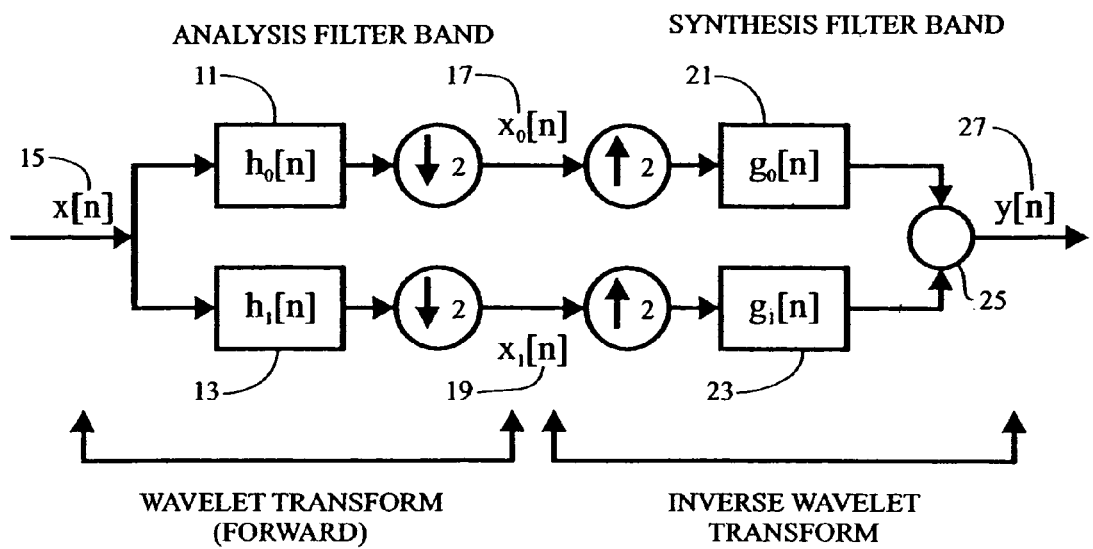
FIG. 2 is an illustration of a wavelet transform for a 1-D signal according to an illustrative embodiment of the present invention.
Figure 3:
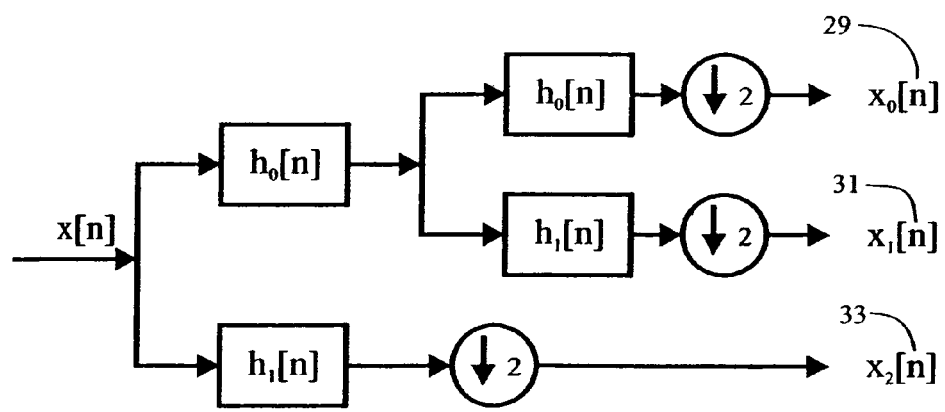
FIG. 3 is an illustration of a recursive two-level octave decomposition according to an illustrative embodiment of the present invention.
Figure 4:
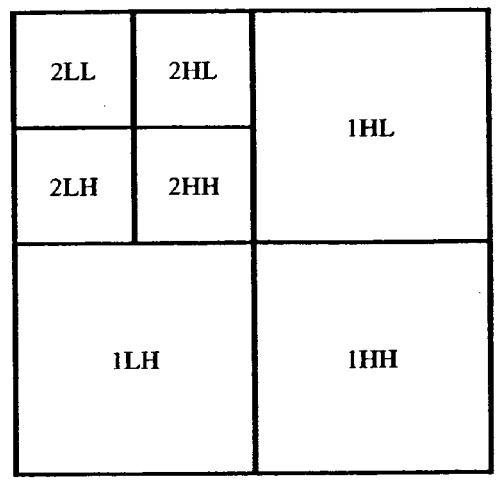
FIG. 4 is an illustration of the wavelet coefficient storage arrangement according to an illustrative embodiment of the present invention.

On a parallel tract in FIG. 1, at step 6, a multi-resolutional steerable wavelet transform is applied to the pixel array in the reference image to produce a multi-resolution representation, realized in a set of transform coefficients. This is further illustrated in FIG. 2, which is a 1-level wavelet transform for a 1-D signal x[n] (chosen for easy illustration). In the (forward) wavelet transform, analysis filters $h_0[n]$ 11 (lowpass) and $h_1[n]$ 13 (highpass) are applied to x[n] 15, respectively. The filtered signals are subsampled by a factor of two, resulting in lowpass signal $x_0[n]$ 17, and highpass signal $x_1[n]$ 19. In the inverse wavelet transform, both the lowpass signal $x_0[n]$ 17 and highpass signal $x_1[n]$ 19 are upsampled by a factor of two, and then corresponding synthesis filters $g_0[n]$ 21 (lowpass) and $g_1[n]$ 23 (highpass) are applied to the upsampled signals, respectively, and finally filtered signal are added up 25 to reconstruct a signal y[n] 27. Furthermore, a multi-resolution wavelet transform is accomplished by recursively applying the wavelet transform to the remaining lowpass signal, as illustrated in FIG. 3, where the lowpass signal after the first stage of wavelet transform is further transformed into a lowpass signal $x_0[n]$ 29 and a highpass signal $x_1[n]$ 31 (the highpass signal after the first stage is maintained as $x_2[n]$ 33). For multi-dimensional signals such as a 2-D image, wavelet transform is usually applied sequentially in both dimensions. The coefficients generated are stored in an array corresponding to the reference image pixel array at step 8 in FIG. 1. In the preferred embodiment using a wavelet transform, the array of the wavelet coefficients is of the same size as the reference image. These coefficients are stored as illustrated in FIG. 4, where a 2-level wavelet transform results in seven bands (or sub-bands), identified as 2LL, 2HL, 2LH, 2HH, 1HL, 1LH, 1HH in FIG. 4.

Figure 5:
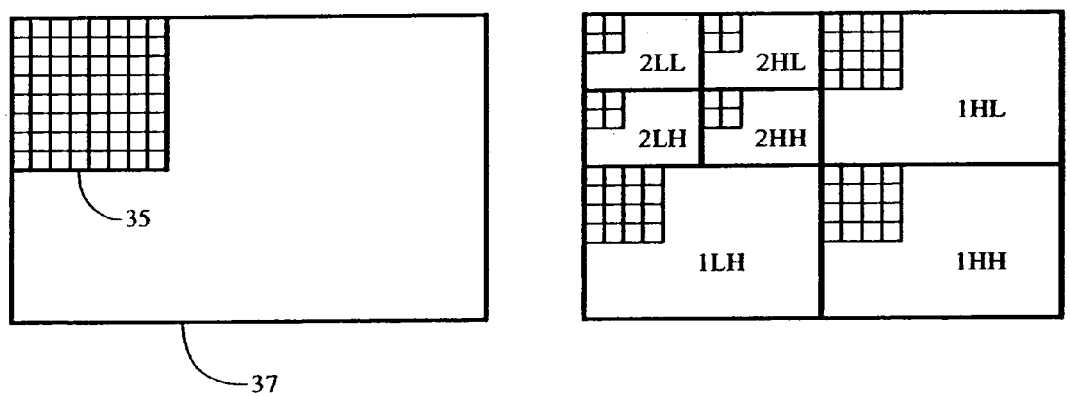
FIG. 5 is an illustration of an image domain and wavelet domain representation of an image according to an illustrative embodiment of the present invention.

Then at step 16 in FIG. 1, the coefficients are relocated according to the random reorder positions established in step 14. In this process, the transform coefficients are divided into sections (or blocks) of appropriate sizes. This may be sizes that decrease by a power of two for each higher level of the wavelet decomposition. In FIG. 5, for a section of 8×8 pixels 35 in the reference image 37, its corresponding sections of wavelet coefficients in the wavelet domain vary in size, with the section in the lowpass band 2LL of the size of 2×2 coefficients, the sections in the highpass bands 2HL, 2LH, and 2HH of the size of 2×2, and the sections in the highpass bands 1HL, 1LH, and 1HH of the size of 4×4, as identified in FIG. 5.

Then, the exchange the block positions would be according to set RS, in the above illustrative description. For example, the first element of '3' in set RS indicates that the first block will move to the third position, and the second element of '2' indicates that the second block stays and does not move, and so on. Also, of particular interest, when one block in the lowpass band is sampled and moved to a random new position, the corresponding blocks in all other different resolutions and bands will follow the same routing to their corresponding new positions, thus maintaining that spatial correspondence relationship.

Next, in FIG. 1, at step 18, a regular inverse wavelet transform is performed to produce a new synthetic texture. This is accomplished by storing the pixel values generated in the inverse transform into a memory array. An important advantage of the present invention is realized by this step. In particular, because the inverse wavelet transform up-samples coefficients by a factor of two and then filters the up-sampled coefficients by corresponding filters, the block boundaries are greatly smoothed during this process and become nearly invisible for most textures. The process in FIG. 1 then completes and is finished at step 20.

The method taught by the present invention is based on the observation that texture is a realization of probability function, however, computationally intensity is managed through estimation and sampling of the true probability function through a novel block sampling. This is because block sampling provides optimal estimation and sampling with considerably lower computational complexity. Those skilled in the art will appreciate that block sampling can be considered as a type of realization of MRF because all of the pixels of synthetic texture are borrowed from the reference texture, along with their neighbors within the blocks. Thus the structural information embedded in the reference texture is well preserved.

Figure 6:
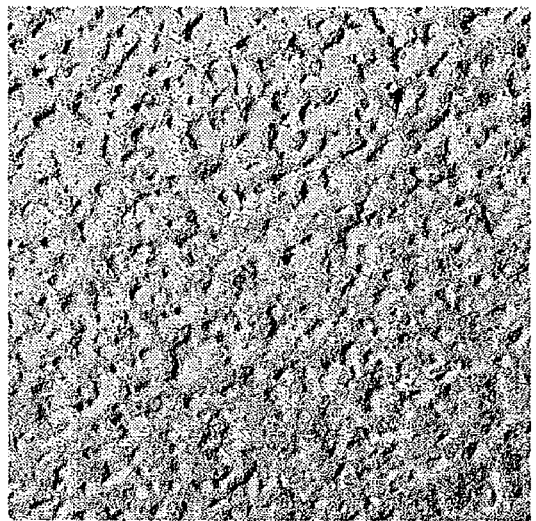
FIG. 6 is a reference image texture utilized by an illustrative embodiment of the present invention.
Figure 7:
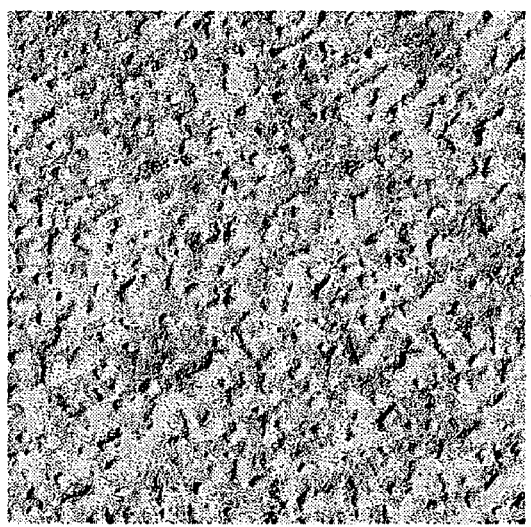
FIG. 7 is a synthetic texture produced by an illustrative embodiment of the present invention.

Reference is directed to FIG. 6, which is a reference texture image 24. FIG. 7 is a synthetically generated texture 26 created in accordance with the method expressed in FIG. 1. Note that perceptual similarity is present, while still creating a distinctiveness in the synthetic texture. The perception of blocking is extremely low.

Figure 10:
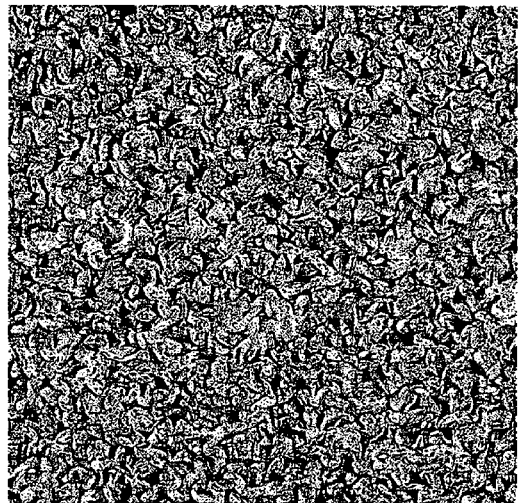
FIG. 10 is a synthetic texture produced by an illustrative embodiment of the present invention.
Figure 11:
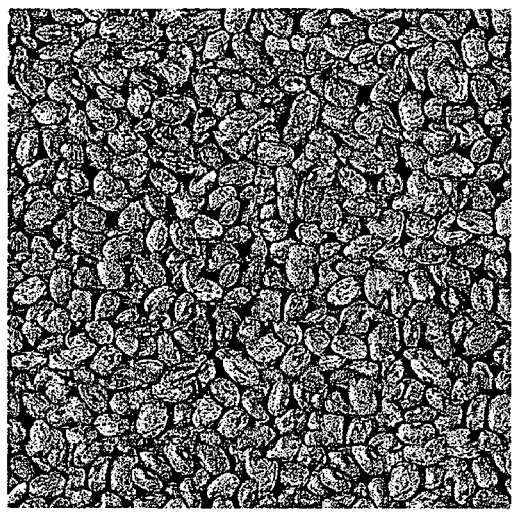
FIG. 11 is a synthetic texture produced by an illustrative embodiment of the present invention.

In FIG. 8, as noted earlier, a reference texture 28 of beans is offered. FIG. 9 is a texture 30 created by random block movement of the pixels directly in the image domain (as opposed to in the wavelet domain) in FIG. 8. The image 28 is 512 by 512 pixels, the block sizes are 32 by 32 pixels. The blocking effect is quite pronounced in FIG. 9. FIG. 10 illustrates a synthetic texture 32 that is created according to the methods illustrated in FIG. 1, but where the section size has been selected to be relatively small with respect to the texel (or bean) size. The results speak for themselves, the perception of the texel in particular and the texture in general is lost. However, in FIG. 11, a texture 34 is shown that operates when the section size is selected to be larger than the texel size. Here, the perception is much improved. The bean-like texel characteristics is present. The synthetic texture is perceptually similar to the reference texture in FIG. 8, yet the distinctiveness is appreciated, and it does not appear to be a mere copy of the reference texture, thus illustrating the advances taught by the present invention.

As noted herein before computational complexity of an algorithm is an important factor that determines whether an algorithm may be adopted for practical applications. The computation cost of algorithms under the present invention is relatively small. In fact, multi-resolution decomposition and reconstruction is the most computationally expensive in the entire scheme. For Heeger's algorithm, since the algorithm requires several iterations to implement the histogram matching at multi-resolution structure, so the computational expense is much greater. Both Efros and Wei's algorithms require substantially even greater computation because both of them generate each pixel of the synthetic texture through intensive matching search. Although Wei employed tree-structure vector quantization to reduce the computation, the computation cost required by the matching search is still huge. The computational expense required by our algorithm may be a little larger than Xu's algorithm because the present invention employs a steerable wavelet transform to form multi-resolution structure. However, the present invention algorithm produces better visual quality with reasonable additional computation cost, and hence strike an better balance.

In contrast to Heeger's original histogram matching algorithm, textural structures are largely retained in the present invention algorithm. Therefore, color becomes less an issue with the present invention. In general, it is not necessary to decompose the RGB three components of a color texture into uncorrected RGB components with SVD (Singular Value Decomposition) algorithm to avoid artifacts, as reported by Heeger. Color texture synthesis can be conveniently performed by synthesizing three corresponding RGB synthetic images under the control of the same random set RS. In other words, color texture synthesis is simply three repetitions of single-channel synthesis according to the same random set RS, as used in the preceding illustrative example.

In many practical applications, a larger texture than the reference texture may need to be synthesized. It is not desirable to simply tile the synthetic texture to form a large image. The present invention texture analysis/synthesis algorithm can be readily extended to such applications. Moreover, it can produce two types of larger synthetic textures. One type is synthetic images having texels of the same size as the reference image but with a large image size. Another type is synthetic textures having texels of larger size. In this case, the synthetic texture not only is larger in size, but also consists of larger texels.

Figure 12:
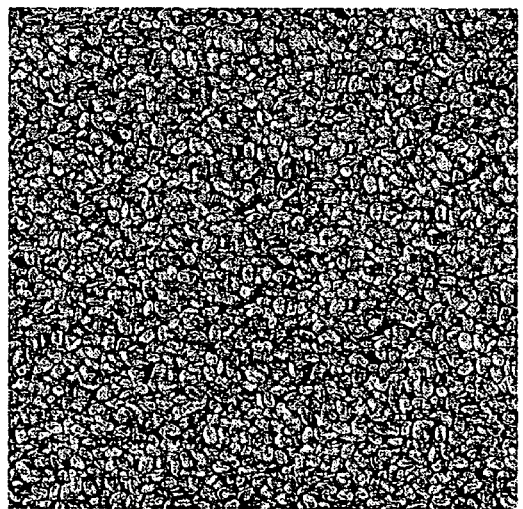
FIG. 12 a synthetic texture produced by an illustrative embodiment of the present invention.

The difference between the basic algorithm and the algorithm that generates larger textures is the formation of the new multi-resolution structure for image synthesis. For the first type of texture image synthesis, if it is intended to synthesize a texture of K times larger in size, then it is necessary to generate K RS sets and then sample the coefficients of all resolutions and sub-bands of the reference texture image according to the K RS sets to form a new multi-resolution structure of texture whose size is K times larger than the reference texture. FIG. 12 illustrates a synthetic texture 36 which has been scaled K times (K=2 in this example). For the second type of texture synthesis, use only one RS set. However, the sampled coefficients of all resolutions and sub-bands will be interpolated K times to form larger texels.

An interesting effect of the present invention texture analysis/synthesis algorithm is that it can generate some textures with new texels, which looks like mutant versions of texels of the reference texture. The technique is that if the size of the sampling block is smaller than the size of the texel, block sampling may cut the texels at different resolutions and bands. For example, the synthetic texture appears to consist of "popped-open" beans in FIG. 10. On the other hand, it is generally recommended that the block size be chosen to be greater than the size of the texels so as to retain the desired perceptual similarity between the reference texture and the synthetic texture.

Figure 14:
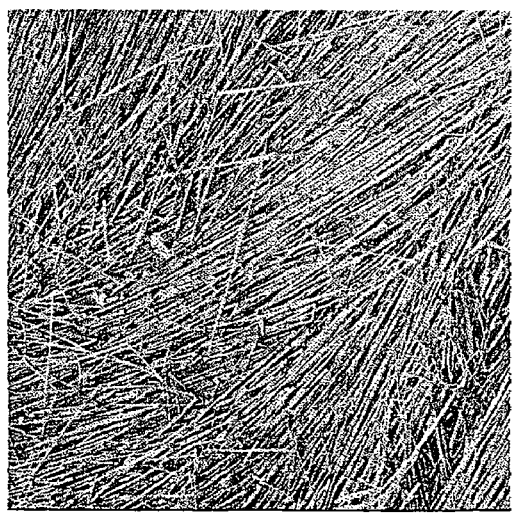
FIG. 14 is a reference image texture utilized by an illustrative embodiment of the present invention.
Figure 15:
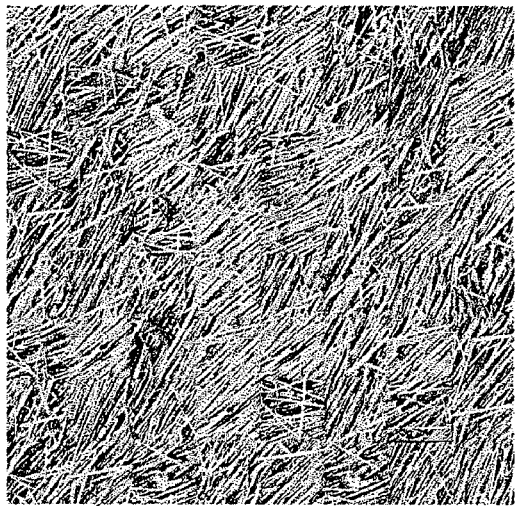
FIG. 15 is a synthetic texture produced by an illustrative embodiment of the present invention.

Certain textures may exhibit strong directionality. See FIG. 14, which is a texture 56 of straw. When the forgoing illustrative embodiment process is employed to generate a synthetic texture from image 56 in FIG. 14, the resultant synthetic texture has the appearance as shown in texture 58 in FIG. 15. While there are strong perceptual similarities, the confusion of directional information detracts from the quality of the synthetic texture. The synthesis of directional texture is one of the most challenging problems. The basic MBS texture synthesis algorithm presented above does not account for directionality due to random block movement. As a result, this basic MBS algorithm does not work well for directional textures. Therefore, in order to guarantee that the synthetic texture is similar to the reference texture, not only should the synthetic texture have the similar texels as that of the reference texture, but it also must exhibit the same directionality, if any, as the reference texture.

It is non-trivial to ensure that the synthetic texture image retains the same directionality. The difficulties reside in two aspects. First, it is extremely difficult to precisely model the directionality of the texture in a mathematical form with a limited number of parameters. Second, it is also extremely difficult to incorporate such information into texture analysis/synthesis algorithms even if the directional information is obtained. In fact, directional texture analysis/synthesis remains largely an open problem within the prior art.

Note that the present invention employs a completely random movement of blocks to implement the estimation and sampling of a probability function in the basic scheme. If the directional information is extracted from the reference texture and is used to guide the texture synthesis process, the synthetic texture will retain the directional information with that of the reference texture. The present invention teaches a directional texture analysis/synthesis algorithm based on directional multi-resolution block sampling (DMBS), which employs the Hough (see M. Sonka, V. Hlavac and R. Boyle, *Image Processing, Analysis and Machine Vision*, Chapman & Hall Computing, London, 1998) transform to estimate the textural direction, cubic spline interpolation to rotate the reference image if necessary, and a modified random set to guide block moving.

Figure 13:
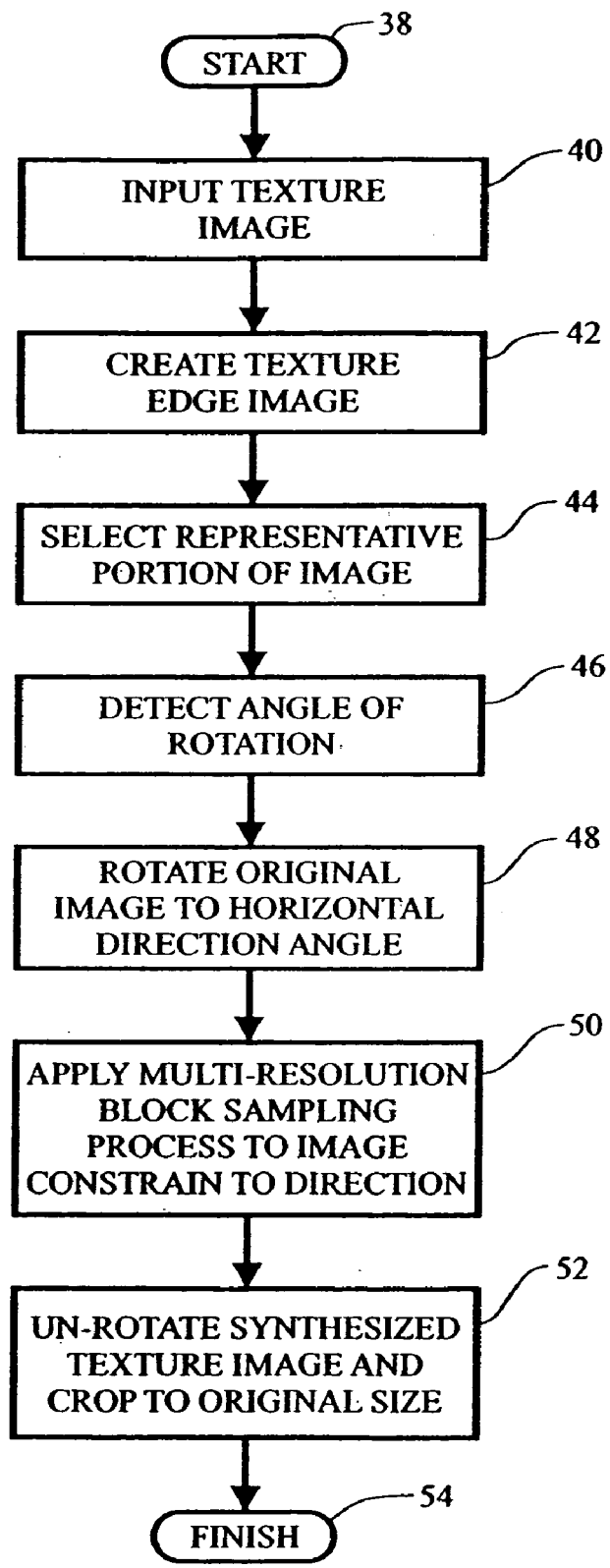
FIG. 13 is a flow diagram of an illustrative embodiment of the present intention.

Reference is directed to FIG. 13, which is a flow diagram of the DMBS process according to an illustrative embodiment of the present invention. Each directional reference texture is assumed to have a single dominant direction. A texture that has multiple salient directions is modeled as an inhomogeneous texture and treated as non-directional texture. The process begins at step 38 and proceeds to step 40 where the reference directional texture image is input. At step 42, a texture edge image is created based on the observation that the direction of the texture is usually represented by edges. A suitable choice for constructing such an edge image is to use Canny operator (see J. Canny, "A Computational Approach to Edge Detection", *IEEE Transactions on Pattern Analysis and Machine Intelligence*, vol. 9, No. 6, pp. 679–698, November 1986). Canny operator extracts edge information with reasonable computation. The resulted edge image is binary and usually has a few nonzero points, which helps reduce the computational complexity of the Hough transform, which is subsequently applied to extract the edge direction.

Figure 16:
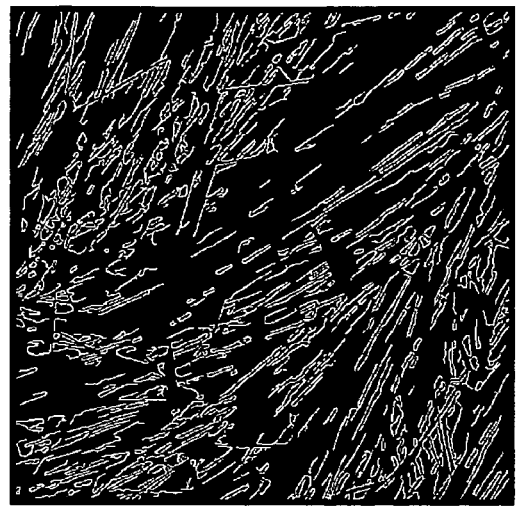
FIG. 16 is a directional texture produced according to an illustrative embodiment of the present invention.
Figure 17:
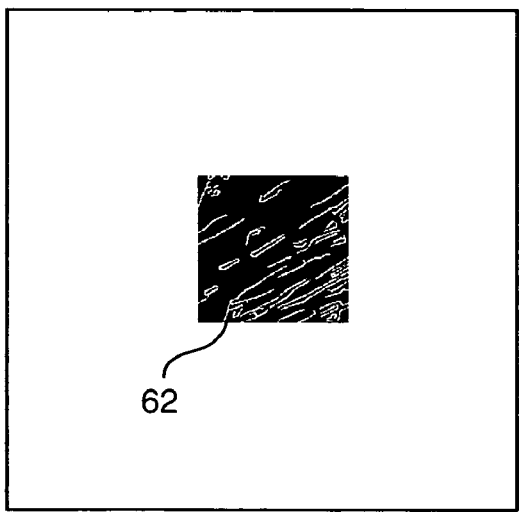
FIG. 17 is a section of a directional texture produced according to an illustrative embodiment of the present invention.

FIG. 16 illustrates the binary edge image 60 obtained by Canny operator from the reference texture. Clearly, this binary image 60 retains the direction of the reference texture 56. A portion of the edge image 60 is isolated and this is illustrated in FIG. 17 as image 62. Selecting a small portion (near the center in this illustrative embodiment) serves to more clearly limit the directionality and reduces computational burden in identifying the directional angle of the texture.

Referring again to FIG. 13, the smaller portion of the edge is selected at step 44. The Hough transform is used in an illustrative embodiment as a means of line delineation. This is accomplished in step 46 in FIG. 13. As is understood by those skilled in the art, a Hough transform maps a straight line in a Cartesian coordinate to a point in a polar coordinate. It is a voting process and the votes are accumulated in an array. The pattern receiving the maximum votes is recognized as the detected pattern. When a straight line is found, a parameter represents its direction. For directional texture image, because it is assumed to have only one dominant direction, this parameter defines the direction of the texture. It is noteworthy that the effectiveness of the direction estimation method described above is generally limited to directional textures containing linear structures. For example, if a directional texture contains rows of circles, such directionality would be difficult to detect.

Once the direction of the texture is obtained, the remaining problem is how to incorporate this directional information into the basic synthesis algorithm. In order to keep the directional information, the block movement is constrained to be only along the estimated direction from step 46. Because it is more complicated in terms of implementation to conduct block sampling and then move sampled blocks along an arbitrary estimated direction, an illustrative embodiment chooses to first rotate the reference texture, and then perform block-sampling on the regular grid, constrain the blocks moving along only the horizontal direction, and finally rotate the synthesized image back to the correct orientation. This is illustrated in FIG. 13 as steps 48, 50, and 52. In order to preserve the image details and not to sacrifice the spatial resolution during the rotating processes, a cubic spline interpolation algorithm is used. Because the rotation angle is most likely not a multiple of 90 degrees, a larger texture is synthesized in order to cut out a synthetic texture patch of the desired size. This is illustrated in FIG. 18, where the reference image has been rotated by the detected angle, and fit into a square block for subsequent block sampling.

Those of ordinary skill in the art will appreciate that there are a few useful interpolation methods, including linear interpolation, bilinear interpolation, and cubic spline interpolation, in an ascending order of detail-preserving capabilities. The cubic-spline interpolation is selected, and is given by:

$$x = \begin{cases} \frac{2}{3} + \frac{1}{2}|x|^3 - (x)^2, & 0 \le |x| \le 1 \\ \frac{1}{6}(2-|x|)^3, & 1 \le |x| \le 2 \end{cases} \quad (5)$$

Figure 18:
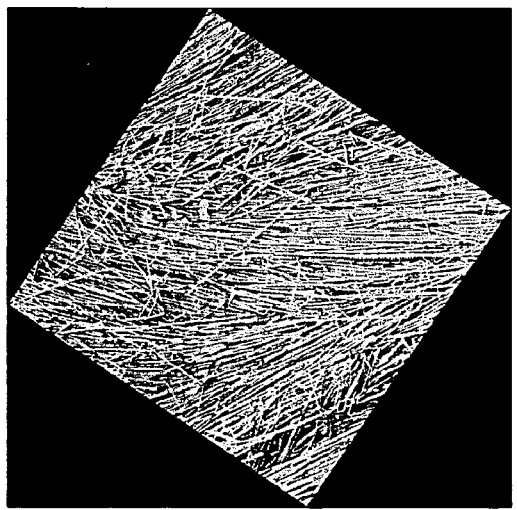
FIG. 18 is a rotated reference image texture utilized by an illustrative embodiment of the present invention.

Note that some data is not available in the rotated image in FIG. 18. Even an image equal in size to the reference image is to be synthesized, it is necessary to cut a smaller image from this rotated image. Moreover, because the synthetic image will be inversely rotated to restore the same direction of the reference texture, it is also necessary to synthesize a larger texture according to the size of desired output texture to guarantee that the cut image will be of the desired size. For example, if the size of the reference texture is K by K with a dominant directional of 45 degrees and it is intended to synthesize a texture image of the same size, cut a quarter size K/2 by K/2 patch from the rotated image of the reference texture and synthesize a four times larger size (2K by 2K) texture image. After rotating this 2K by 2K synthetic texture inversely by 45 degrees, a K by K size texture can be cut from the rotated version of the synthetic texture to produce the final output texture. Note that the above procedure does not maximize the use of the reference texture.

In the multi-resolution block sampling algorithm according to the present invention, block moving is controlled by a completely random set. In order to ensure that the blocks move only along the horizontal direction (without loss of generality due to the rotation), as in step 50 in FIG. 13, it is necessary to modify this random movement-controlling set. Although moving sampled blocks only along the horizontal direction may reduce the randomness and richness of the synthetic texture, correct incorporation of the directionality in the synthetic texture often outweighs such a reduction, which is generally invisible due to the masking effect intrinsic to textures.

Figure 19:
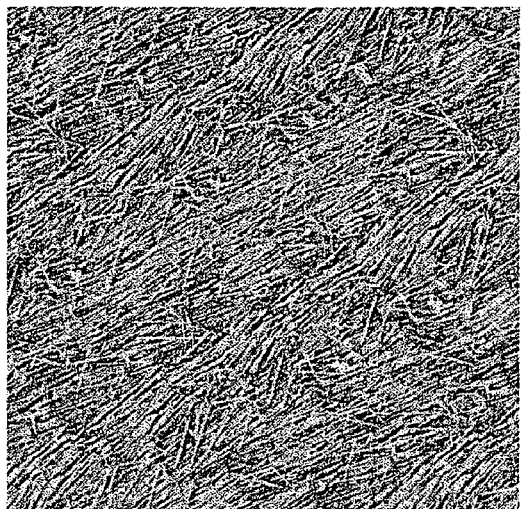
FIG. 19 is a synthetic texture produced by an illustrative embodiment of the present invention.
Figure 20:
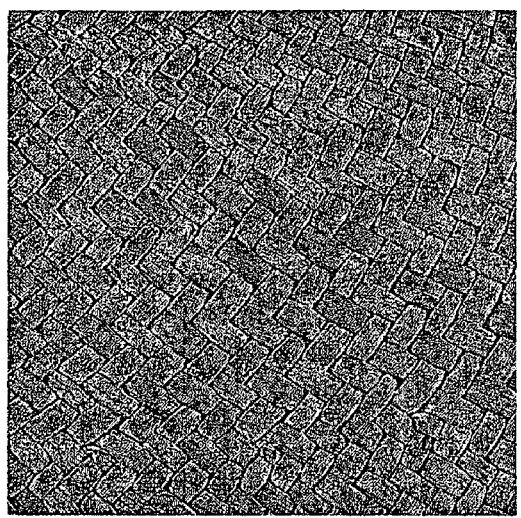
FIG. 20 is a reference image texture utilized by an illustrative embodiment of the present invention.
Figure 21:
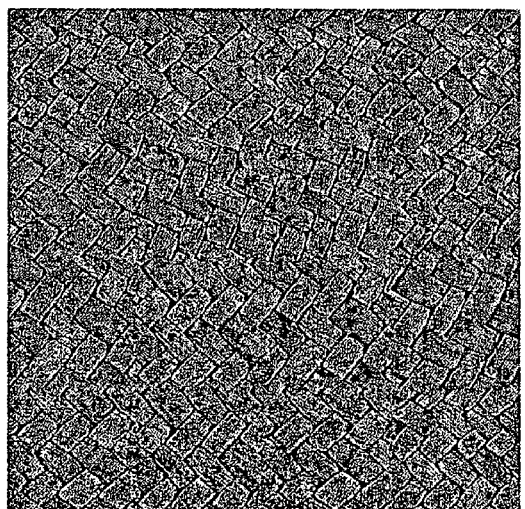
FIG. 21 is a synthetic texture produced by an illustrative embodiment of the present invention.
Figure 22:
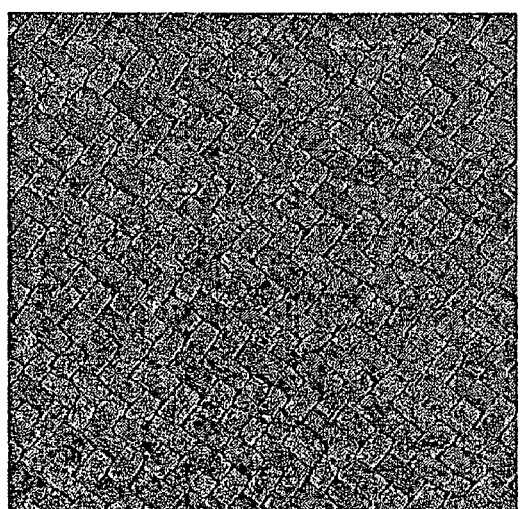
FIG. 22 is a synthetic texture produced by an illustrative embodiment of the present invention.

The performance of the forgoing directional algorithm is demonstrated in FIGS. 19 by the directionally correct synthetic texture 66. Similarly, FIG. 20 is a reference texture of a basket weave design 68. FIG. 21 shows a synthetic texture 70 according to the non-directionally correct algorithm of the present invention. On the other hand, FIG. 22 illustrates a synthetic texture 72 according to the directionally corrected algorithm under the present invention.

Figure 23:
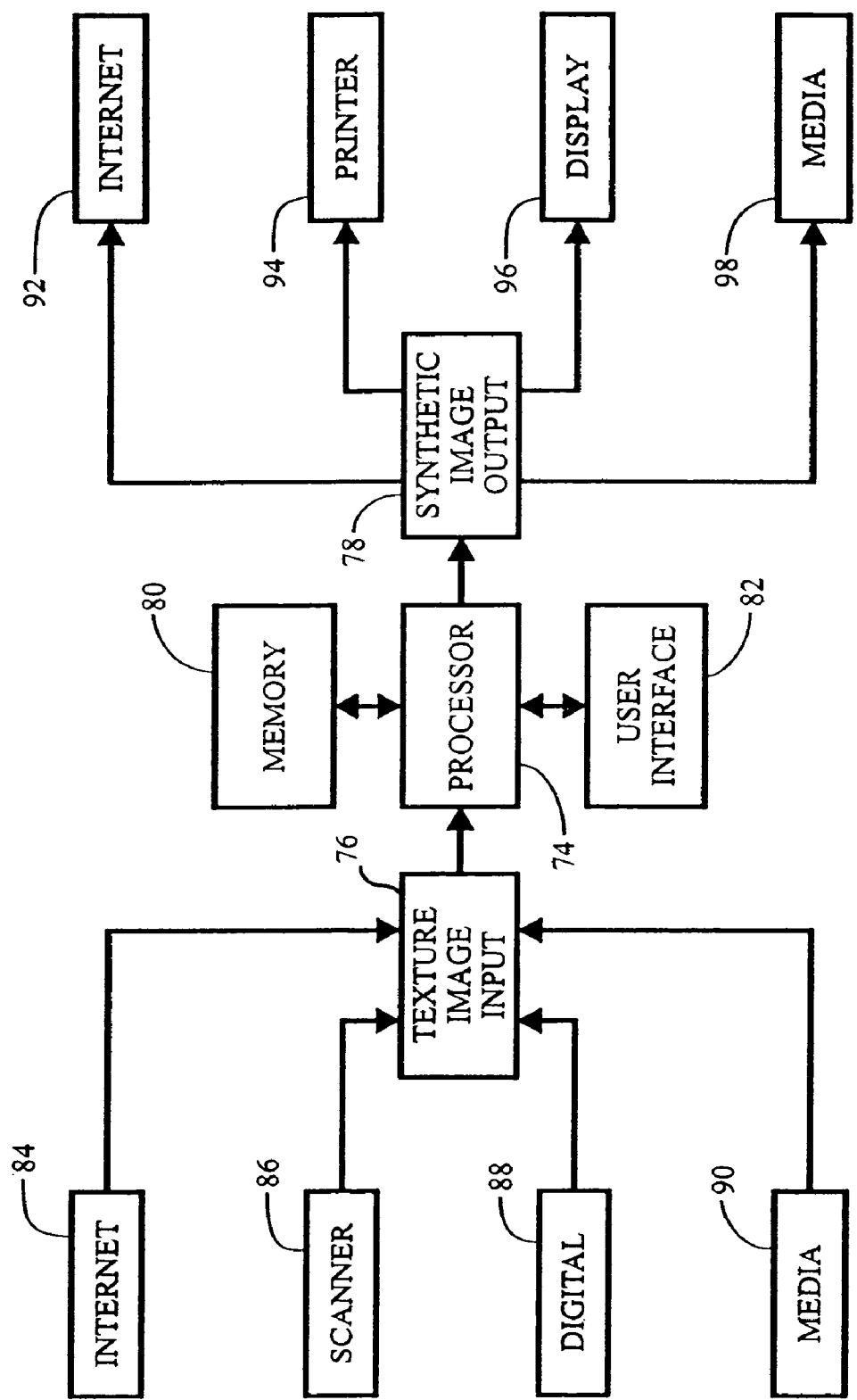
FIG. 23 is a functional block diagram of an illustrative embodiment apparatus according to the present invention.

Reference is directed to FIG. 23, which is a functional block diagram of an apparatus according to the present invention. As will be understood by those skilled in the art, any suitable processor 74 can be used to execute the software that makes operative the processes of the present invention. In addition to processor 74, a suitable memory 80 is also required. This may be of any of the types understood or available to artisans from time to time. What is necessary is for the processor 74 to be operative to read and write pixel values and or transform coefficients to and from the memory 80. Also, some form of user interface 82 may be desirable so that a user can input desired control parameters when needed.

Reference texture images are received at an input to the processor 76. The source of these textures can be many and varied as are available in the art from time to time. These include, but are not limited to an Internet connection 84, a flatbed or film scanner 86, a digital imaging device 88, or some form of media 90. Examples of media include, but are not limited to magnetic disks, optical disks, hard disk drives, memory cards, or other media types. The processor 74 also outputs synthetic images to an output port 78. The output port 78 may be coupled to any suitable output device or communications media as are available to artisans from time to time. These include, but are not limited to the Internet 92, a printer 94, a display device 96, or any form of media 98.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A method of synthesizing a texture from an array of pixels, comprising the steps of:
    decomposing the array of pixels through application of a wavelet transform to produce a plurality of coefficients ordered to correspond to the array of pixels, said coefficients being divided into a plurality of resolution levels;
    defining sections of coefficients in each of said resolution levels, to provide a plurality of sections;
    reordering said plurality of sections, and performing an inverse transform on said reordered plurality of sections.

2. The method of claim 1 wherein the array of pixels is a reference texture image.

3. The method of claim 1 wherein said reordered plurality of sections are reordered by random selection.

4. The method of claim 1 further comprising the steps of storing said plurality of coefficients in a memory array and wherein said reordering step is accomplished by moving coefficient values within said memory array on a section by section basis.

5. The method of claim 1 wherein the array of pixels is a texture image, and the size of said section is selected to be at least as large as a texel element within the texture image.

6. The method of claim 1 wherein said sections are block shaped.

7. The method of claim 1 wherein said transform is a steerable wavelet transform and said inverse transform is an inverse wavelet transform.

8. The method of claim 7 wherein said plurality of coefficients includes at least a lowpass band representation of the pixels.

9. The method of claim 7 wherein said steerable wavelet transform accomplishes a mapping of the pixels from a spatial domain to coefficients in the wavelet domain and said inverse wavelet transform accomplishes a mapping of said plurality of coefficients from the wavelet domain to pixels in the spatial domain.

10. The method of claim 7 wherein said plurality of sections are sampled and said inverse wavelet transform is applied recursively at all resolution levels of said multi-resolutional representation.

11. The method of claim 1 wherein the array of pixels includes a red pixel array, a green pixel array, and a blue pixel array, forming a color image, further comprising the steps of repeating said decomposing and said performing steps three times, for each of the red pixel array, the green pixel array, and the blue pixel array, while utilizing the same defining and reordering steps for each.

12. The method of claim 1 wherein said texture is scaled to a different size according to a scaling factor, further comprising the steps of:
    randomly sampling said plurality of sections and
    moving the coefficients to a number of new sections equal to the number of said plurality of sections times said scaling factor.

13. The method of claim 1 wherein said plurality of sections are scaled to a different size according to a scaling factor, further comprising the step of interpolating the coefficient's sizes by said factor.

14. A method of synthesizing a directional texture from an image texture having an array of pixels, comprising the steps of:
    determining the direction of the image texture;
    calculating an offset angle between said determined direction and a reference direction;
    rotating the array of pixels according to said offset angle;
    decomposing said rotated array of pixels through application of a transform to produce a plurality of coefficients ordered to correspond to said rotated array of pixels;
    defining a plurality of sections within of said plurality of coefficients;
    reordering said plurality of sections such that they are moved but are constrained to a position along a line parallel to said reference direction;
    synthesizing a texture by performing an inverse transform on said reordered plurality of sections, and
    rotating said synthesized texture by the negative of said offset angle.

15. A method of synthesizing a directional texture from an image texture having an array of pixels, comprising the steps of:
    determining the direction of the image texture;
    calculating an offset angle between said determined direction and a reference direction;
    decomposing said array of pixels through application of a transform to produce a plurality of coefficients ordered to correspond to said array of pixels;
    defining a plurality of sections within of said plurality of coefficients;

reordering said plurality of sections such that they are moved but are constrained to a position along a line parallel to said reference direction; and synthesizing a texture by performing an inverse transform on said reordered plurality of sections.

16. The method of claim 14 wherein said determining step further comprises the steps of:

extracting edge information from the image texture; and determining the direction of the image texture from said edge information.

17. The method of claim 16 wherein said edge information is extracted using a Canny operator.

18. The method of claim 16 wherein said direction is determined using a Hough transform.

19. A system for synthesizing a texture from an array of pixels, comprising:

a memory for storing the array of pixels;

a processor coupled to said memory and operable to decompose the array of pixels through application of a wavelet transform to produce a plurality of coefficients ordered to correspond to the array of pixels, said coefficients being divided into a plurality of resolution levels, said processor being operable to store said plurality of coefficients in said memory;

said processor operable to define sections of coefficients in each of said resolution levels, to provide a plurality of said sections in said memory;

said processor operable to reorder said plurality of sections, and said processor operable to synthesize a texture by performing an inverse transform on said reordered said plurality of sections.

20. The system of claim 19 wherein the array of pixels is a reference texture image.

21. The system of claim 19 wherein said processor is operable to reorder said plurality of sections by random selection.

22. The system of claim 19 wherein the array of pixels is a texture image, and said processor is operable to set the size of set source sections to be at least as large as a texel element within the texture image.

23. The system of claim 19 wherein said sections are block shaped.

24. The system of claim 19 wherein said transform is a steerable wavelet transform.

25. The system of claim 24 wherein said plurality of coefficients includes at least a lowpass band representation of the pixels.

26. The system of claim 24 wherein said processor is operable to calculate wavelet transforms that map the pixels from a spatial domain to coefficients in the wavelet domain, and operable to calculate said inverse wavelet transforms so as to map said plurality of coefficients from the wavelet domain to pixels in the spatial domain.

27. The system of claim 19 wherein said processor samples said plurality of sections, said processor is operable to perform said inverse transform recursively at all resolution levels of a multi-resolutional representation.

28. The system of claim 19 wherein the array of pixels includes a red pixel array, a green pixel array, and a blue pixel array, forming a color image, and said processor is further operable to repeat said decomposing and said synthesizing for each of the red pixel array, the green pixel array, and the blue pixel array, while utilizing the same section definitions and reordering for each.

29. The system of claim 19 wherein: said processor is operable to scale said texture to a different size according to a scaling factor, by randomly sampling said plurality of sections in said memory, and moving the coefficients to a number of destination sections in said memory equal to the number of said plurality of sections times said scaling factor.

30. The system of claim 19 wherein said plurality of sections in said memory are rescaled to a different size according to a scaling factor, and said processor is operable to interpolate the coefficient's sizes by said scaling factor.

31. A apparatus for synthesizing a directional texture from an image texture having an array of pixels, comprising:

a memory having the array of pixels stored therein, a processor coupled to said memory and operable to recall a portion of the array of pixels and determine a direction of the image texture, and operable to calculate an offset angle between said determined direction and a reference direction;

said processor operable to rotate the array of pixels in said memory according to said offset angle;

said processor operable to decompose said rotated array of pixels through application of a plurality of wavelet transforms to produce and store in said memory a plurality of coefficients ordered to correspond to said rotated array of pixels;

said processor operable to define a plurality of source sections of said plurality of coefficients and operable to move the coefficients from said plurality of source sections to a plurality of destination sections in said memory which are reordered, but constrained to a position along a line parallel to said reference direction, and said processor operable to synthesize a texture by performing a plurality of inverse wavelet transforms on the reordered said plurality of coefficients in said memory, and operable to rotate said synthesized texture in said memory by the negative of said offset angle.

32. The apparatus of claim 31 wherein said processor determines the direction of rotation of the image texture by extracting edge information from the image, and determining the direction of the image texture from said edge information.

33. The apparatus of claim 32 wherein said processor is operable to extract said edge information using a Canny operator.

34. The apparatus of claim 32 wherein said processor is operable to determine said direction using a Hough transform.

35. A system for synthesizing a texture from an array of pixels, comprising:

means for decomposing the array of pixels through application of a wavelet transform to produce a plurality of coefficients ordered to correspond to the array of pixels, said coefficients being divided into a plurality of resolution levels;

means for defining sections of coefficients in each of said resolution levels, to provide a plurality of sections;

means for reordering said plurality of sections, and means for performing an inverse transform on said reordered plurality of sections.

* * * * *